United States Patent Office 3,311,560
Patented Mar. 28, 1967

3,311,560
AUTOMATIC TRANSMISSION FLUIDS CONTAINING QUATERNARY AMMONIUM THIOPHOSPHATES
Bruce W. Hotten, Orinda, Calif., assignor to Chevron Research Company, a corporation of Delaware
No Drawing. Filed Mar. 10, 1964, Ser. No. 350,665
4 Claims. (Cl. 252—75)

This invention relates to compounded automatic transmission fluids. More particularly, it relates to automatic transmission fluids characterized by excellent corrosion-resistant and deposit-resistant properties.

Automatic transmission fluids used in modern high horsepower automobiles are subject to extreme operating conditions. The fluids must act as power transmission media, heat transfer media and hydraulic control media. They are usually subjected to extremely high operating temperatures. Thus, an acceptable fluid must perform its multiple functions while maintaining optimum resistance to oxidation and freedom from deposit formation. In addition, the fluid must be carefully compounded so as to impart proper friction characteristics.

As to the particular requirements, of great importance is that of resistance to deposit formation. Fluids improperly compounded oxidize at the high temperatures encountered, leaving deposits which are particularly harmful often causing transmission malfunctions and failures. These deposits plug the numerous ports through which the transmission oils must flow in order to assure proper shifting during movement of the automobile. The plugging of these ports results in improper flow of the fluid to the various parts of the transmission, often resulting in their improper lubrication and consequent damage.

Most automatic transmissions contain planetary gears which are actuated by vertical metal discs which are known as the "driven discs." Alternating with these driven discs is a set of vertically-spaced discs which are known as the "driving discs." These driving discs are consequently rotating when the engine is in operation. One set of discs is faced with a hard fiberlike material as found on brake bands. All of the discs are bathed in the transmission fluid. In the operation of the automatic transmission, the fiber-based discs and the plain metal discs come into contact with each other to bring about the change in gear ratios with the desired driving speed. When this contact is being made, the fiber-faced discs begin to rotate until they are firmly attached to the metal discs and rotating at the same speed as the metal discs. However, when sludging and lacquer formation occur, a condition is often brought about so that when the fiber-faced discs and the plain metal discs contact one another, a phenomenon known as "stick-slip" takes place. This occurs when the fiber composition disc momentarily grabs the steel discs, then momentarily slips upon the surface of the steel discs, then grabs the steel discs again. Thus interrupted motion is transmitted to the driving mechanism of the automobile. In addition, because of the improper contact of the discs, complete slippage can occur, resulting in automatic shifting from lower gear ratios to higher gear ratios, causing a sudden speeding up of the engine. Such a speeding up of the engine and the consequent friction caused with the transmission oil itself increases the temperature of the transmission oil. The resulting high temperature often causes a condition wherein the disc-facing particles are pulled from the facings and dispersed in the oil. These particles further assist in plugging the ports through which the automatic transmission fluid must travel for the proper functioning of the transmission.

Of further significance, is the maintenance of proper viscosity of the transmission fluid. An unstabilized fluid subjected to the conditions of the automatic transmission will increase in viscosity due to oxidation of the fluid, and thus prevent proper operation of the transmission. Thus, it is necessary to prevent viscosity increase with a stabilizer.

Another factor of importance is that the transmission fluid leave no insoluble residue that will cause wear of operating parts.

It has now been found that transmission fluids possessing highly desirable characteristics can be prepared from a major proportion of a mineral lubricating oil base, from 0.1% to 3% by weight of a quaternary ammonium salt of a dithiophosphate, and minor proportions of conventional transmission fluid additives, including viscosity index improvers, oxidation and corrosion inhibitors and rust inhibitors. The quaternary ammonium salts of this invention may be represented by the general formula.

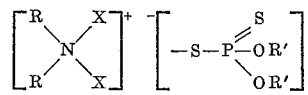

wherein X is selected from the group consisting of ethyl and methyl radicals, R is selected from the group consisting of alkyl radicals having from 1 to 18 carbon atoms, benzyl radicals, alkylbenzyl radicals having from 8 to 25 carbon atoms, monohydroxyalkyl radicals having from 1 to 18 carbon atoms and their mixtures, and R' is selected from the group consisting of alkyl radicals having from 4 to 18 carbon atoms and alkylphenyl radicals having from 8 to 25 carbon atoms and their mixtures.

The mineral lubricating oil which is employed in the invention is a light mineral oil having a viscosity of from 50 to 400 SSU at 100° F. The typical power transmission fluids in which the aforementioned additives are employed contain as a general rule a viscosity index improver, a polymeric detergent, a rust preventive agent and an oxidation inhibitor.

The conventional additives employed in the transmission fluid in addition to the above described quaternary ammonium salts include from 1% to 15% by weight of a polymeric viscosity index improver, such as mixed alkyl methacrylate polymers and polyisobutylenes.

Suitable polymeric detergents are oil soluble copolymers of alkyl methacrylates and vinyl pyrrolidones and the reaction product of N-methyl piperazine with quadripolymers of dodecyl methacrylate, octadecyl methacrylate, polyethylene glycol methacrylate and glycidyl methacrylate.

An example of a preferred viscosity index improver which may be employed in the compositions of this invention is an alkyl methacrylate-vinyl pyrrolidone copolymer. This polymer is identified as an alkyl methacrylate-vinyl pyrrolidone copolymer having a molecular weight of approximately 300,000 and a nitrogen content of about 1%, wherein the alkyl radicals are mixed $C_{12}$ and $C_{18}$ alkyl radicals. This additive in addition to its viscosity index improving function also performs as a detergent and a pour point depressant. Another example of a suitable viscosity index improver is a polymerized alkyl methacrylate having an average of 12 carbon atoms in the alkyl chain and a molecular weight of about 200,000.

Suitable polymers and copolymers such as those typified by these examples with molecular weights of from 100,000 to 300,000 may be used in the compositions of this invention.

The oxidation inhibitors of this invention are selected from suitable diaryl amines and di-tert.butyl phenols. Useful di-tert.butyl phenols include di-(tert.butyl)-p-cresol; 4,4'-methylene-bis (2,6-di-tert.butyl phenol); 2,6-di-(tert.butyl) - α-dimethylamino-p-cresol; and 2,6-di-(tert.

butyl)phenol. Suitable diaryl amines include phenyl-α-naphthylamine, bis-(octylphenyl)amine, phenothiazine and N,N'-diphenyl-p-phenylene diamine. These oxidation inhibitors are employed in minor amounts, from 0.1% to 1% by weight of the composition.

The foam suppressant of this invention is a dimethyl silicone polymer employed in amounts from 0.0008% to 0.01% by weight of base oil.

The rust preventives which are employed in the invention are pentaerythritol monooleate, calcium petroleum sulfonate and alkenyl succinic acids. A preferred calcium petroleum sulfonate is one having a ratio of basic to neutral calcium of about 7.3:1 and a molecular weight of about 400. Calcium petroleum sulfonates are employed in amounts from 10 to 450 mm./kg. of base oil. Pentaerythritol monooleate is employed in amounts from 0.05 to 1.0% by weight. Alkenyl succinic acids having a molecular weight of from 400 to 3000 are suitable rust inhibitors in the compositions.

Base oils used for the automatic transmission fluids of this invention include a variety of light hydrocarbon oils, for example, naphthenic base, paraffin base and mixed base mineral oils; other hydrocarbon oils, such as those derived from coal and synthetic oils, such as alkylene polymers. The compound oils suitable for use in this invention have viscosity indexes between 130 and 150 normally being in the range of 135–145.

As previously mentioned, the stabilizers employed in the compositions of this invention are quaternary ammonium dialkyl dithiophosphates, wherein the cation is represented by the formula

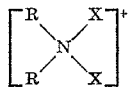

wherein X is ethyl or methyl and R is alkyl of from 1 to 18 carbon atoms, alkylbenzyl of from 8 to 25 carbon atoms or monohydroxyalkyl of from 1 to 18 carbon atoms. The cation is derived from the corresponding quaternary base or quaternary halide. Illustrative cations are dioleylidimethylammonium, benzyltrimethylammonium and alkylbenzyldiethylhydroxyethylammonium ions.

The anionic portion of the additive

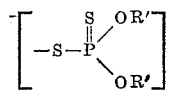

wherein R' is an alkyl radical of from 4 to 18 carbon atoms or an alkylphenoxy radical of from 8 to 18 carbon atoms, may be produced from dithiophosphoric acid derivatives, such as bis (alkylphenoxy) dithiophosphoric acid and various dialkyl dithiophosphoric acids and their corresponding alkali metal salts.

The quaternary ammonium derivative may be produced by a metathetical reaction of the quaternary ammonium halide with the dithiophosphoric salt, or by a typical neutralization reaction of quaternary base and dithiophosphoric acid. In the neutralization reaction, the quaternary base and the thiophosphoric acid are mixed in water, and any other remaining solvents are evaporated from the mixture, preferably on a steam bath. In the metathesis reaction, the quaternary halide and the alkali salt are mixed, and the alkali halide is removed by water washing before stripping of the water and solvents.

The following examples illustrate the preparation of typical additives by the metathetical and neutralization reactions. The examples are intended to be only illustrative, without limitation of the invention.

*Example 1.—Preparation by neutralization*

27 grams (0.1 mole) of dialkoxy dithiophosphoric acid [(RO)$_2$PS$_2$H made from 64 mole percent isobutanol, 27 mole percent 2-methyl-1-butanol, 5.5 mole percent 1-pentanol and 3.8 mole percent 3-methyl-1-butanol] was mixed in a vessel with 126 g. (0.1 mole) of dioleyldimethylammonium hydroxide. The mixture was stripped of water and solvent on a steam bath yielding a pale liquid having a viscosity of 153 SSU at 100° F. and analyzing 1.4% N (theoretical 1.6%).

*Example 2.—Preparation by metathesis*

27 grams (0.1 mole) of dialkoxy dithiophosphoric acid (as described in Example 1) was mixed with 5.8 g. (0.1 mole) KOH and 82 g. (0.1 mole) of N-alkylbenzyldiethylhydroxyethylammonium chloride in a reaction vessel. KCl was removed by water washing and the water and excess solvent was removed by stripping on a steam bath. The reaction yielded a pale viscous liquid having a viscosity of 1530 SSU at 100° F., and analyzing 1.5% N (theoretical 2.2%).

Automatic transmission fluids containing the quaternary ammonium salts of this invention were subjected to a General Motors Corporation Oxidation Test, a brief description of which is as follows: A 300 cc. sample of the composition being tested is placed in a glass sample tube immersed in an oil bath at 350° F. A portion of copper and iron wires which act as oxidation catalysts are placed around a glass air-delivery tube. Air which has been saturated by water maintained at a temperature of 100° F. is metered through the delivery tube placed at the bottom of the sample at a rate of 8 liters per hour. The test is run for a period of 150 hours, at which time the sample is removed, the viscosity increase at 210° F. and the pentane insoluble material in the sample are measured.

The above-described test was run using a base reference fluid consisting of 50% 100 neutral oil, 44% of a mineral oil having a viscosity of 85 SSU at 100° F., 4.0% of the alkyl methacrylate-vinyl pyrrolidone copolymer described in column 2, 1.5% oil-soluble polyisobutylene, 0.4% (di-tert.-butyl)-p-cresol and 0.1% pentaerythritol monooleate.

As noted in the following Table I, the reference fluid containing no dithiophosphate stabilizer oxidized to a solid tar during the test period. A pentane insoluble measurement of less than 1% is considered desirable for an automatic transmission fluid.

TABLE I.—G.M.C. OXIDATION TEST—150 HOURS AT 350° F.

| Thiophosphate at 0.4% | | Viscosity at 210° F., SSU | | | Percent Insolubles |
|---|---|---|---|---|---|
| Cation | Anion | Before | After | Percent Change | |
| None (base fluid alone) | None (base fluid alone) | 51 | Solid | | |
| Zinc | Dialkoxy dithiophosphate [1] | 51 | 70 | +38 | 0.07 |
| Dioleyldimethylammonium | do [1] | 51 | 65 | +26 | 0.47 |
| Benzyltrimethylammonium | do [1] | 51 | 64 | +26 | 2.0 |
| N-dodecylbenzyldiethyl-hydroxyethylammonium | do [1] | 51 | 68 | +33 | 0.25 |
| Benzyltrimethylammonium | Bis(alkylphenoxy) dithiophosphoric acid [2] | 51 | 118 | +127 | 1.8 |
| N-dodecylbenzyldimethyl-hydroxyethylammonium | do [2] | 51 | 62 | +20 | 0.04 |

[1] Alkoxy residue=63.6% isobutanol, 36.4% amylols, average molecular weight alcohols 79.2.
[2] Di(polypropylphenyl), average 13 alkyl carbons on each phenyl radical.

It may be seen from the above data that the quaternary ammonium thiophosphates are successful stabilizers for automatic transmission fluids. The results indicate that these compounds compare favorably with the zinc thiophosphates which are known in the prior art in their ability to prevent viscosity increase in the fluids. Also it may be noted that the alkylbenzyldiethylhydroxyethylammonium and dioleyldimethylammonium derivatives show a marked superiority over the zinc compound in reducing viscosity increase, which is a measure of the sludge-forming tendency of the composition. In addition, the formation of pentane-insoluble material was held within acceptable limits.

Another factor of some significance is that the quaternary ammonium compounds are "ash-free," that is, they contribute no metal ion to the composition. This factor is becoming increasingly important with increasing transmission speeds and operating temperatures, as it has been shown that metal ions often contribute to the corrosive tendency of these fluids.

In addition to the described additives, the compositions in accordance with this invention may contain supplementary oiliness agents, other friction control agents, oxidation inhibitors, etc.

While the character of this invention has been described in detail with examples, this has been done by way of illustration only and without limitation of the invention. It will be apparent to those skilled in the art that numerous modifications and variations of the illustrative examples may be made in the practice of the invention within the scope of the following claims.

I claim:

1. A power transmission fluid consisting essentially of a major portion of a mineral lubricating oil base and from 0.1% to 3.00% by weight of a quarternary ammonium salt of a diorgano dithiophosphoric acid, said salt being represented by the general formula

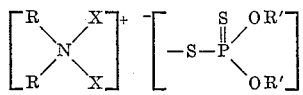

in which X is selected from the group consisting of ethyl and methyl radicals, R is selected from the group consisting of alkyl radicals having from 1 to 18 carbon atoms, benzyl radicals, alkylbenzyl radicals having from 8 to 25 carbon atoms, monohydroxyalkyl radicals having from 1 to 18 carbon atoms and mixtures thereof, and R' is selected from the group consisting of alkyl radicals having from 4 to 18 carbon atoms and alkylphenyl radicals having from 8 to 25 carbon atoms and mixtures thereof, said mineral lubricating oil base having a viscosity of from 50 to 400 SSU at 100° F. and containing minor portions of supplementary additives consisting essentially of (A) from 1.0% to 15.0% by weight of a polymeric viscosity index improver selected from the group consisting of (1) an alkyl methacrylate-vinyl pyrrolidone copolymer having a molecular weight of about 300,000 and a nitrogen content of about 1% and in which the alkyl groups are mixed $C_{12}$ and $C_{18}$ radicals and (2) polymerized alkyl methacrylates having an average of 12 carbon atoms in the alkyl chain and a molecular weight of about 200,000, (B) from 1.0% to 15% by weight of the reaction product of N-methylpiperazine with a quadripolymer comprised of monomeric constituents of dodecyl methacrylate, octadecyl methacrylate, polyethylene glycol methacrylate and glycidyl methacrylate in a molar ratio of about 33/17/1/1, wherein the polyethylene glycol has a molecular weight from 500 to 2500, and the molecular weight of the polymer is from 100,000 to 300,000, (C) from 1.0% to 15% by weight of a rust preventative selected from the group consisting of pentaerythritol monoleate, calcium petroleum sulfonate and alkenyl succinic acids having a molecular weight of from 400 to 3000, (D) from 0.1% to 1% by weight of an aromatic oxidation inhibitor selected from the group consisting of 2,6-di-(tert.butyl)-p - cresol, 4,4' - methylene-bis-(2-6-di-tert.butyl phenol), 2,5-di-(tert.butyl)-p-cresol, 2,6-(tert.butyl)phenol, phenyl-α-naphthylamine, bis-(octylphenyl)amine and phenothiazine, (E) from 0.0008 to 0.1% by weight of a dimethyl silicone foam inhibitor.

2. The power transmission fluid of claim 1 in which the quarternary ammonium salt is the N-dodecyl-benzyl diethylhydroxyethyl ammonium salt of a bis-(alkylphenoxy) dithiophosphoric acid having an average of 13 alkyl carbon atoms on each phenyl radical.

3. The power transmission fluid of Claim 2 in which the polymeric viscosity index improver is an alkyl methacrylate-vinyl pyrrolidone copolymer having a molecular weight of about 300,000 and a nitrogen content of about 1% and in which the alkyl groups are mixed $C_{12}$ and $C_{18}$ radicals.

4. The power transmission fluid of claim 1 in which the quaternary ammonium salt is dioleyldimethyl ammonium dialkoxy dithiophosphate in which the alkoxy radicals are derived from a mixture of isobutyl and amyl alcohols.

References Cited by the Examiner
UNITED STATES PATENTS 3,156,653  11/1964  Foehr _____ 252—78
3,175,976  3/1965   Foehr _____ 252—75

ALBERT T. MEYERS, *Primary Examiner.*

LEON D. ROSDOL, *Examiner.*

R. D. LOVERING, *Assistant Examiner.*

UNITED STATES PATENT OFFICE
CERTIFICATE OF CORRECTION

Patent No. 3,311,560

March 28, 1967

Bruce W. Hotten

It is hereby certified that error appears in the above numbered patent requiring correction and that the said Letters Patent should read as corrected below.

Column 3, line 25, for "compound" read -- compounded --; column 6, line 19, for "monoleate" read -- monooleate --; line 25, for "2-6" read -- 2,6 --; line 28, for "0.1%" read -- 0.01% --.

Signed and sealed this 7th day of November 1967.

(SEAL)
Attest:

Edward M. Fletcher, Jr.
Attesting Officer

EDWARD J. BRENNER
Commissioner of Patents